United States Patent [19]

Seeley

[11] 3,967,943

[45] July 6, 1976

[54] METHOD OF IMPROVING GLASS BATCH MELTING BY USE OF WATER GLASS

[75] Inventor: Clarence E. Seeley, Lancaster, Ohio

[73] Assignee: Anchor Hocking Corporation, Lancaster, Ohio

[22] Filed: Oct. 30, 1974

[21] Appl. No.: 519,084

[52] U.S. Cl. .................................... 65/27; 65/134; 65/335; 106/52; 106/DIG. 8
[51] Int. Cl.² .................... C03B 1/00; C03B 5/16; C03C 3/04
[58] Field of Search ..................... 65/27, 134, 335; 106/DIG. 8, 52

[56] References Cited
UNITED STATES PATENTS

| | | | |
|---|---|---|---|
| 2,220,750 | 11/1940 | Bair et al. ................................ | 65/27 |
| 2,975,555 | 3/1961 | Zellers, Jr. et al. ...................... | 65/27 |
| 3,503,790 | 3/1970 | Gringrass ................................ | 65/134 |
| 3,682,666 | 8/1972 | Lacourrege ............................. | 65/134 |
| 3,798,018 | 3/1974 | Paridon et al. ............. | 106/DIG. 8 X |
| 3,838,998 | 10/1974 | Matthews et al. ............. | 106/DIG. 6 |
| 3,875,282 | 4/1975 | Steinreich ............................ | 65/27 X |
| 3,883,364 | 5/1975 | Robertson et al. ............ | 106/DIG. 8 |
| 3,907,956 | 9/1975 | Meunier ................................ | 65/27 X |
| 3,924,030 | 12/1975 | Tatara et al. ......................... | 65/27 X |

FOREIGN PATENTS OR APPLICATIONS

| | | | |
|---|---|---|---|
| 243,530 | 2/1963 | Australia ............................... | 65/27 |
| 1,034 | 1852 | United Kingdom ............ | 106/DIG. 8 |

Primary Examiner—S. Leon Bashore
Assistant Examiner—Frank W. Miga
Attorney, Agent, or Firm—Wood, Herron & Evans

[57] ABSTRACT

In the making of glass containing $Na_2O$ as an oxide constituent, sodium silicate water solution ("water glass") is used as a batch ingredient to supply a fraction, but only a minor fraction, of the $Na_2O$ content. Conventional sodium-containing batch materials supply the bulk of the $Na_2O$ content. Such use of the water glass has been found to improve the batch flow pattern in the glass melting furnace and thereby to increase batch homogeneity. Improvements in seed, cord and production efficiency ("percent pack") are attained.

6 Claims, No Drawings

METHOD OF IMPROVING GLASS BATCH MELTING BY USE OF WATER GLASS

This invention relates to improvements in the batching and melting of glass compositions from oxide-forming batch ingredients. More specifically, the invention concerns use of sodium silicate water solution as a batch ingredient to provide a small proportion of the $Na_2O$ oxide content of the glass composition.

It is common glass making technique to use soda ash ($Na_2CO_3$) as a component in glass making batches, together with sand and other glass making ingredients. The $CO_2$ content of the soda ash is driven off in melting, and the sodium content enters into the glass composition as sodium oxide, $Na_2O$. Other sodium containing batch materials such as caustic soda (NaOH), sodium sulfate, sodium nitrate, feldspar, nepheline syenite and aplite are also frequently used as batch constituents and, like soda ash, contribute to the $Na_2O$ content of the glass.

This invention is predicated on the concept of using sodium silicate water solution (commonly known as "water glass") in the batch to provide a minor percent of the total $Na_2O$ content that the glass is to have. Water glass is not the only sodium containing batch material that is to be used, and in fact it should not constitute more than about 10% of the total $Na_2O$ content. At least one other sodium containing batch material (e.g., $Na_2CO_3$, NaOH, etc.) should be used to supply the balance of the $Na_2O$ content of the glass composition.

Water glass is a commercially available product which may be made by reaction of $SiO_2$ (from silica sand) with sodium carbonate at high temperature. It also occurs as a by-product in the manufacture of certain aluminum silicate type catalysts. It is well known for use as a bonding agent or adhesive, and is widely used for that purpose.

Because of its adhesive quality, water glass has a tendency to cement, or bond together, particulate materials. In view of this it has been thought to be unsuitable as a constituent in glass batches, which must be free flowing for charging.

U.S. Pat. No. 3,065,089 teaches mixing water glass solution with a dry (solid) silicate of a bivalent metal and then dehydrating the mixture as by spray drying, to form a powder which can be melted to form a glass. The dry powder of course lacks the adhesive characteristic of water glass solution.

U.S. Pat. No. 3,065,090 teaches digesting the dry conventional glass batching alkali ingredients, sodium carbonate, sodium sulfate, and sodium bicarbonate, to form a saturated water solution. The digested material is mixed with sand and an additional quantity of the dry alkali. The mixture is formed as agglomerates which can be charged to a furnace for melting.

In accordance with this invention, it has been found that if added to a batch in a certain manner and in limited quantities, water glass is not only not harmful but in fact gives surprising advantages.

The formula of water glass is commonly expressed as $Na_2SiO_3$, but its exact composition in terms of percentages of $Na_2O$, $SiO_2$ and $H_2O$ (and in terms of $Na_2O/SiO_2$ ratio) vary, depending upon source. These variations in the liquid material do not appear to make a great difference for purpose of this invention, and the use of water glass herein is not limited to water glass of any precise composition.

One commercially available sodium silicate water solution suitable for use in the method of this invention is sold by Englehard Industries, Newark, N.J. under their designation "X-17-67", and comprises 43% solids (as sodium silicate) with the remainder being water, having the approximate oxide analysis by weight:

| 15% $Na_2O$ | 28% $SiO_2$ | 57% $H_2O$ |

In that material the ratio of silica to sodium oxide is 1.9, and the formula of the material may be expressed as $Na_2O:1.9\ SiO_2$. However, this is not critical, and other water glass compositions in which this ratio is in the range of about 1.6 to 3.8, or with sodium silicate solids contents in the range of about 30–55% by weight, can also be used.

Sodium silicate water solution is a relatively viscous liquid. It is peferably mixed with other batch ingredients in the mixer or in the wet batch feed screw, prior to charging the same to the furnace. Over a period of time it has a tendency to set up or agglomerate dry particulate materials to which it has been added. A batch to which it has been added should be melted before such set up occurs, else the batch becomes quite difficult to handle because its free-flowing characteristics are impaired.

In the glass making furnace, the water content of the water glass is lost, and the silicate content may be regarded as incorporated in the glass as the oxides $Na_2O$ and $SiO_2$.

The addition of sodium silicate water solution in an amount which provides between about 1% and up to about 10% of the $Na_2O$ content of the glass, has been found to effect important and unexpected improvements. The most surprising result, and the most important, is a significant increase in the "percent pack" of finished articles formed from glass with water glass added to the batch. "Percent pack" is the proportion or percent of the total number of glass articles which have been formed, which pass inspection and are acceptable for shipment to customers. Just why the use of water glass should increase the percent pack is not clear, beyond the overall observation that it reduces the incidence of inhomogeneities or defects such as cord and seed, etc., which otherwise would be experienced in production of similar articles from glass having the same oxide analysis, but without the water glass addition. Even small improvements in percent pack are very important economically.

A second unexpected result of the invention is that the addition of sodium silicate water solution in partial replacement of other sodium-containing batch materials enables a lower temperature and/or less fuel to be used in melting. In short, the furnace temperature can be reduced to produce the same or, as shown above, more consistent quality final product.

Third, the water glass has a wetting and agglomerating effect that forms a wet batch of better handling characteristics than would otherwise be displayed, and dust and carryover are reduced. In this regard the water glass apparently acts as a binder and causes some "briquetting" or compaction of the batch.

Peculiarly, the advantages obtained by use of sodium silicate water solution are not obtained if corresponding amounts of sodium oxide (as soda ash), silica, and water are added in unreacted or uncombined form. It is the use of these components interreacted as water glass which provides the unexpected results, not their mere appearance as oxide constituents in the final product. In this respect it is important to note that the invention does not require, or necessarily effect, any change in the as-analyzed oxide content of the glass composition. That is to say, a glass with a desired oxide analysis can be formed with the oxide precursors partially in the form of water glass, instead of soda ash and sand. Other oxide components may be adjusted accordingly, following well known principles of batch oxide determination.

As the proportions of water glass are increased, the batches gradually become too difficult to handle with the conventional equipment, and set up is too rapid. This problem becomes quite difficult when the water glass exceeds roughly about 10% of the $Na_2O$ content, and at larger amounts this problem becomes still worse.

The following example demonstrates the preferred method of carrying out the invention, in comparison to the prior practice.

PRIOR PRACTICE

A conventional glass batch was made from the following batch constituents:

| Sand | 1800 lbs. |
|---|---|
| Soda Ash | 589 |
| Limestone | 477 |
| Feldspar | 110 |
| Slag | 63 |
| Cullet | 539 |
| Gypsum | 14 |
| Decolorizer | 42 oz. |

The major sodium-containing constituent of this batch was the soda ash, but the cullet and feldspar also provided some sodium oxide.

The oxide analysis (as calculated) of the final product was:

| $SiO_2$ | 73.14 % |
|---|---|
| $Fe_2O_3$ | .044 |
| $Al_2O_3$ | 1.35 |
| $CaO$ | 10.89 |
| $MgO$ | .65 |
| $Na_2O$ | 13.55 |
| $K_2O$ | .16 |
| $MnO$ | .005 |
| $S$ | .023 |
| $SO_3$ | .19 |

The soda ash content of the batch accounted for 97.4% of the $Na_2O$ content of the final composition.

This material was melted at a peak temperature of 2820° F. After forming into carbonated beverage containers the percent pack of this batch averaged about 88%.

EXAMPLE I

In order to utilize the invention in the manufacture of glass articles having the same theoretical oxide analysis (for all practical purposes), about 4½% of the soda ash content (i.e., 24 lbs.) was replaced with 140 lbs. of "X-17-67" sodium silicate water solution having the composition, 14.95 wt. % $Na_2O$; 28.13% $SiO_2$ and 56.92% $H_2O$, bulk density 12.9No./gallon. The batch composition was:

| Sand | 1800 lbs. |
|---|---|

-continued

| Soda Ash | 565 |
|---|---|
| Limestone | 487 |
| Feldspar | 112 |
| Slag | 65 |
| Water Glass | 140 (10.8 gal.) |
| Cullet | 539 |
| Gypsum | 14 |
| Decolorizer | 42 oz. |

It can be seen that the sand content remained the same but limestone and feldspar were adjusted upwardly by 10 and 2 pounds, respectively, to maintain the same overall oxide proportions. This batch totaled 35 lbs. more than the conventional batch, but both produced melts having theoretical oxide analyses which were almost identical. The water glass provided 5.8% of the total $Na_2O$ of the glass.

The water glass was added to the dry other ingredients in the mixer by means of a positive displacement gear pump at ambient temperature. The batch was mixed for a period of 2 minutes in the mixer. The batch would have hardened to an unworkable degree in about 2 hours after the water glass addition, and was charged to the furnace in less than 2 hours after mixing. When charged, the mix still behaved as free-flowing granules, and there was no harmful setup within that time period. When charged to the furnace it was observed that there was less "skating" of batch materials on the surface of the melt in the tank than had been present with the conventional batch. The percent pack improved to 90 percent, a 2 percent increase over the percent pack experienced in the conventional batch. The batch was melted at a temperature of 2800° F., about 20° F. lower than the standard batch. Since the two runs were similar in all other respects, it is believed that furnace temperature reduction and the percent pack improvement are solely the result of the use of water glass as one of the sodium containing constituents.

EXAMPLE II

The water glass can alternatively be added to the glass batch at the wet batch screw which is conventionally employed to transfer the dry ingredients from the mixed batch storage tube to the furnace charger. Addition at this point, rather than in the batch mixer as disclosed in Example I, minimizes the degree of batch "hardening" that the water glass tends to cause. Moreover, larger amounts of water glass can be added per batch in this manner, the only limiting factor being the capacity of the batch charger to feed the batch into the furnace.

In one test, in a batch otherwise similar to that referred to above, the amount of water glass added through the wet batch screw comprised 7.5% of the total $Na_2O$ content of the batch. A "wet batch" of excellent characteristics was delivered to the charger. It is believed that the maximum useful addition of water glass comprises about 10% of the $Na_2O$ content.

Having described the invention, what is claimed is:

1. In the preparation of a glass composition containing $Na_2O$ as an oxide constituent thereof, said composition being melted from a batch of glass making materials including sodium-containing batch materials which upon melting provide the said $Na_2O$ content of said composition, the improvement comprising, preparing an unreacted batch of glass making materials into which sodium silicate water solution is mixed as one of the sodium-containing materials thereof, the amount of sodium silicate water solution being such as to provide about 1–10% of the total $Na_2O$ content of said composition, said batch including the said sodium silicate water solution being prepared at ambient temperature so that the components thereof do not react or set up, including in said batch at least one other sodium-containing material in addition to said sodium silicate water solution, the other sodium-containing material being present in said batch in particulate solid form and providing about 90–99% of the total $Na_2O$ content of said composition, the batch being semi-wet through the inclusion of said water solution, gradually charging the thus prepared unreacted semi-wet batch to a continuous melting furnace after said sodium silicate water solution has been mixed into it but before it hardens, so that batch setup does not occur, melting the batch so formed in the furnace, and forming non-particulate bulk articles such as beverage containers from the molten glass, the percent pack of the finished articles exceeding that of similar articles having the same oxide analysis but made without use of any sodium silicate water solution.

2. The method of claim 1 wherein said sodium silicate solution is added by spraying the same onto other glass making materials of the batch as the latter are being mixed.

3. The method of claim 1 wherein the said batch is charged into a furnace for melting not more than about 2 hours after said solution has been added.

4. The method of claim 1 wherein said solution is a solution containing about 30–55% sodium silicate solids.

5. The method of claim 1 wherein said solution contains sodium silicate as $Na_2O \times SiO_2$, where X is a number in the range of 1.6 to 3.8.

6. The method of claim 1 wherein said sodium silicate solution comprises, on an analyzed basis, approximately 15% $Na_2O$, 28% $SiO_2$ and 57% $H_2O$ by weight.

\* \* \* \* \*